United States Patent
Wu et al.

(10) Patent No.: US 12,237,926 B2
(45) Date of Patent: Feb. 25, 2025

(54) HARQ CODEBOOK DETERMINING METHOD AND APPARATUS, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Zuomin Wu, Guangdong (CN); Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 347 days.

(21) Appl. No.: 17/457,855

(22) Filed: Dec. 6, 2021

(65) Prior Publication Data

US 2022/0094482 A1 Mar. 24, 2022

Related U.S. Application Data

(63) Continuation of application No. PCT/CN2019/101184, filed on Aug. 16, 2019.

(51) Int. Cl.
*H04L 1/00* (2006.01)
*H04L 1/1812* (2023.01)
(Continued)

(52) U.S. Cl.
CPC .......... *H04L 1/1812* (2013.01); *H04L 1/1893* (2013.01); *H04W 72/23* (2023.01)

(58) Field of Classification Search
None
See application file for complete search history.

(56) References Cited

U.S. PATENT DOCUMENTS

2019/0037586 A1* 1/2019 Park .................... H04L 5/00
2019/0306841 A1* 10/2019 Huang .................. H04L 5/0055
(Continued)

FOREIGN PATENT DOCUMENTS

CN 107332646 A 11/2017
CN 108289015 A 7/2018
(Continued)

OTHER PUBLICATIONS

First Office Action of the Japanese application No. 2021-577842, issued on Jul. 5, 2023. 7 pages with English translation.
(Continued)

*Primary Examiner* — Gerald A Smarth
(74) *Attorney, Agent, or Firm* — Perkins Coie LLP

(57) ABSTRACT

An HARQ codebook determining method and apparatus, a terminal device, and a network device are disclosed. The method includes: a terminal device determines a target channel group, the target channel group including at least one channel, and a first channel in the target channel group corresponding to a first HARQ codebook; the terminal device determines a target HARQ codebook to be transmitted on a first uplink resource, wherein the first uplink resource is a HARQ feedback resource corresponding to the target channel group, if the first channel meets a first processing delay, the target HARQ codebook includes the first HARQ codebook, or if the first channel does not meet the first processing delay, the target HARQ codebook does not include the first HARQ codebook or the target HARQ codebook does not include the valid first HARQ codebook.

12 Claims, 4 Drawing Sheets

PDSCH       PUCCH

(51) Int. Cl.
*H04L 1/1867* (2023.01)
*H04W 72/23* (2023.01)

(56) References Cited

U.S. PATENT DOCUMENTS

| | | | | |
|---|---|---|---|---|
| 2020/0344012 A1* | 10/2020 | Karaki | ................ | H04L 1/1861 |
| 2021/0075556 A1* | 3/2021 | Karaki | ................ | H04B 7/0456 |

FOREIGN PATENT DOCUMENTS

| | | | | | |
|---|---|---|---|---|---|
| CN | 109152053 | A | | 1/2019 | |
| CN | 109391422 | A | | 2/2019 | |
| CN | 109644467 | A | | 4/2019 | |
| CN | 109905211 | A | | 6/2019 | |
| JP | 2020506579 | A | | 2/2020 | |
| WO | WO-2014018984 | A1 | * | 1/2014 | ............ H04B 17/27 |
| WO | 2017186174 | A1 | | 11/2017 | |
| WO | 2018128356 | A1 | | 7/2018 | |
| WO | WO-2019050368 | A1 | * | 3/2019 | ............ H04B 7/0456 |
| WO | 2019073357 | A1 | | 4/2019 | |
| WO | 2019144833 | A1 | | 8/2019 | |
| WO | WO-2020029696 | A1 | * | 2/2020 | ............ H04L 1/1607 |
| WO | WO-2020031357 | A1 | * | 2/2020 | ............ H04B 7/0456 |

OTHER PUBLICATIONS

Second Office Action of the Chinese application No. 2022100531927, issued on Jun. 7, 2023. 23 pages with English translation.
Examination Report for Indian Application No. 202127054588 issued May 13, 2022. 7 pages with English translation.
Extended European Search Report for European Application No. 19942442.5 issued Apr. 4, 2022. 7 pages.
Samsung "HARQ enhancements for NR-U" R1-1906922; 3GPP TSG RAN WG1 #97; Reno, USA; May 13-17, 2019.
Notice of Allowance for Chinese Application No. 202210053192.7 Issued Sep. 12, 2023, 4 Pages with English Translation.
3GPP TSG RAN WG1 Meeting #93—R1-1806301—Busan, Korea, May 21-25, 2018—CATT, Remaining issues on HARQ-ACK codebook (7 pages).
3GPP TSG RAN WG1 Meeting #97—R1-1906328—Reno, USA, May 13-17, 2019—CATT, UL control enhancements for URLLC (8 pages).
International Search Report issued May 20, 2020 of PCT/CN2019/101184 (4 pages).
Examination Report for European Application No. 19942442.5 issued Jan. 24, 2023. 4 pages.
First Office Action for Chinese Application No. 202210053192.7 issued Mar. 1, 2023. 26 pages with English translation.
Nokia et al. "HARQ scheduling and feedback for NR-U" R1-1904183; 3GPP TSG RAN WG1 Ad-Hoc Meeting #96bis; Xi'an, China; Apr. 8-12, 2019. 12 pages.
Second Office Action for Japanese Application No. 2021-577842 issued Dec. 8, 2023. 8 pages with English translation.
Third Office Action of the Japanese application No. 2021-577842, issued on May 24, 2024. 10 pages with English translation.
Notification of Decision of Rejection of the Japanese application No. 2021-577842, issued on Oct. 1, 2024. 2 pages with English translation.
Notification of Decision of Dismissal of Amendment of the Japanese application No. 2021-577842, issued on Oct. 1, 2024. 7 pages with English translation.
Notification of First Office Action of the Korean application No. 10-2021-7042123, issued on Nov. 8, 2024. 14 pages with English translation.

* cited by examiner

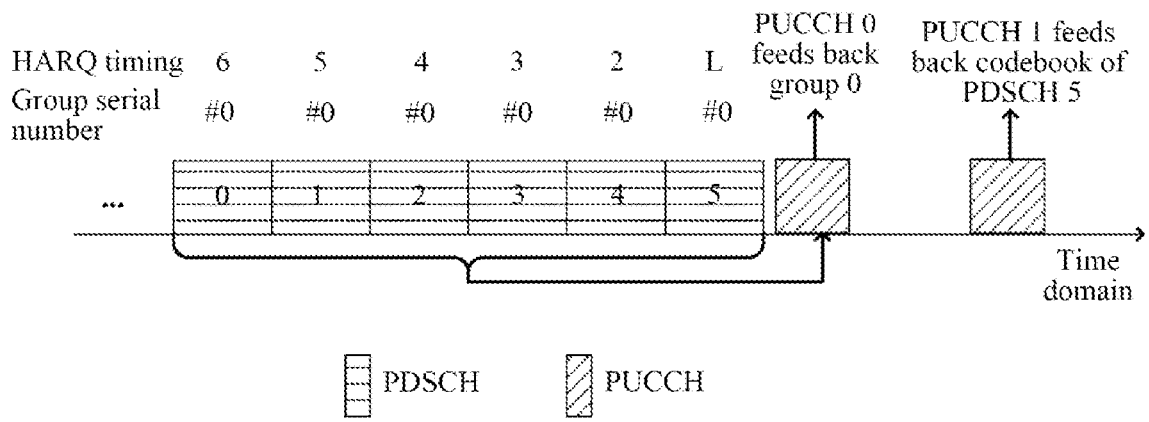

FIG. 4

A network device determines a first uplink resource, the first uplink resource is used for transmitting a target HARQ codebook corresponding to a target channel group, the target channel group includes at least one channel, and a first channel in the target channel group corresponds to a first HARQ codebook — 501

The network device determines the target HARQ codebook, wherein in a case where the first channel meets a first processing delay, the target HARQ codebook includes the first HARQ codebook, or in a case where the first channel does not meet the first processing delay, the target HARQ codebook does not include the first HARQ codebook or the target HARQ codebook does not include a valid first HARQ codebook — 502

FIG. 5

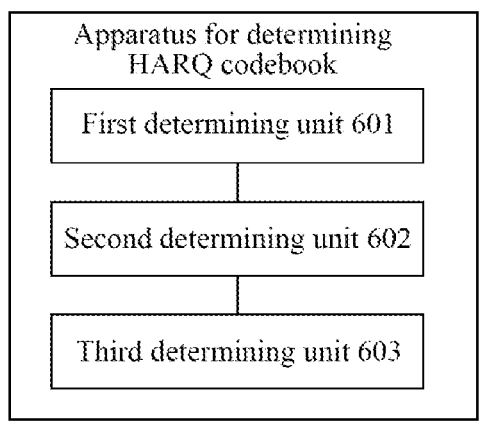

FIG. 6

HARQ CODEBOOK DETERMINING METHOD AND APPARATUS, TERMINAL DEVICE, AND NETWORK DEVICE

CROSS-REFERENCE TO RELATED APPLICATION

The present application is a continuation application of International PCT Application No. PCT/CN2019/101184, filed on Aug. 16, 2019, the entire content of which is hereby incorporated by reference.

TECHNICAL FIELD

Implementations of the present disclosure relate to the field of mobile communication technologies, and specifically, to a method and an apparatus for determining a Hybrid Automatic Repeat reQuest (HARQ) codebook, a terminal device, and a network device.

BACKGROUND

In order to flexibly feed back HARQ information corresponding to a Physical Downlink Shared Channel (PDSCH), a base station may group scheduled PDSCHs, so that a terminal device performs corresponding HARQ feedback according to different groups after receiving the PDSCHs.

The terminal device performs HARQ feedback according to the grouping by the base station, but the grouping rule of the base station is not limited. Thus, for the terminal device, there may be a case that for PDSCHs in a certain group of PDSCHs, feedback may not be performed in time on an HARQ feedback resource corresponding to the group of PDSCHs, such as a Physical Uplink Control Channel (PUCCH) resource. In such a case, how the terminal device determines an HARQ codebook that needs to be fed back is a problem worth studying.

SUMMARY

The implementations of the present disclosure provide a method and an apparatus for determining an HARQ codebook, a terminal device, and a network device.

A method for determining an HARQ codebook provided by an implementation of the present disclosure includes:
determining, by a terminal device, a target channel group, the target channel group including at least one channel, and a first channel in the target channel group corresponding to a first HARQ codebook; and
determining, by the terminal device, a target HARQ codebook to be transmitted on a first uplink resource, the first uplink resource being an HARQ feedback resource corresponding to the target channel group, wherein
in a case where the first channel meets a first processing delay, the target HARQ codebook includes the first HARQ codebook, or
in a case where the first channel does not meet the first processing delay, the target HARQ codebook does not include the first HARQ codebook or the target HARQ codebook does not include a valid first HARQ codebook.

A method for determining an HARQ codebook provided by an implementation of the present disclosure includes:
determining, by a network device, a first uplink resource, the first uplink resource being used for transmitting a target HARQ codebook corresponding to a target channel group, the target channel group including at least one channel, and a first channel in the target channel group corresponding to a first HARQ codebook; and
determining, by the network device, the target HARQ codebook, wherein in a case where the first channel meets a first processing delay, the target HARQ codebook includes the first HARQ codebook, or
in a case where the first channel does not meet the first processing delay, the target HARQ codebook does not include the first HARQ codebook or the target HARQ codebook does not include a valid first HARQ codebook.

An apparatus for determining an HARQ codebook provided by an implementation of the present disclosure includes:
a first determining unit, configured to determine a target channel group, the target channel group including at least one channel, and a first channel in the target channel group corresponding to a first HARQ codebook; and
a second determining unit, configured to determine a target HARQ codebook to be transmitted on a first uplink resource, the first uplink resource being an HARQ feedback resource corresponding to the target channel group, wherein
in a case where the first channel meets a first processing delay, the target HARQ codebook includes the first HARQ codebook, or
in a case where the first channel does not meet the first processing delay, the target HARQ codebook does not include the first HARQ codebook or the target HARQ codebook does not include a valid first HARQ codebook.

An apparatus for determining an HARQ codebook provided by an implementation of the present disclosure includes:
a first determining unit, configured to determine a first uplink resource, the first uplink resource being used for transmitting a target HARQ codebook corresponding to a target channel group, the target channel group including at least one channel, and a first channel in the target channel group corresponding to a first HARQ codebook; and
a second determining unit, configured to determine the target HARQ codebook, wherein in a case where the first channel meets a first processing delay, the target HARQ codebook includes the first HARQ codebook, or
in a case where the first channel does not meet the first processing delay, the target HARQ codebook does not include the first HARQ codebook or the target HARQ codebook does not include a valid first HARQ codebook.

A terminal device provided by an implementation of the present disclosure includes a processor and a memory. The memory is configured to store a computer program, and the processor is configured to call and run the computer program stored in the memory to perform the method for determining an HARQ codebook.

A network device provided by an implementation of the present disclosure includes a processor and a memory. The memory is configured to store a computer program, and the processor is configured to call and run the computer program stored in the memory to perform the method for determining an HARQ codebook.

A chip provided by an implementation of the present disclosure is configured to implement the method for determining an HARQ codebook.

Specifically, the chip includes: a processor configured to call and run a computer program from a memory to cause a device mounted with the chip to perform the method for determining an HARQ codebook.

A computer-readable storage medium provided by an implementation of the present disclosure is configured to store a computer program that causes a computer to perform the method for determining an HARQ codebook.

A computer program product provided by an implementation of the present disclosure includes computer program instructions that cause a computer to perform the method for determining an HARQ codebook.

A computer program provided by an implementation of the present disclosure, when run on a computer, causes the computer to perform the method for determining an HARQ codebook.

Through the above technical solutions, when preparing a target HARQ codebook corresponding to a target channel group for a first uplink resource, the terminal device determines the target HARQ codebook according to whether the first channel in the target channel group meets a processing delay, which may avoid misunderstanding between the base station and the terminal device.

BRIEF DESCRIPTION OF DRAWINGS

Accompanying drawings described herein are intended to provide further understanding of the present disclosure, and form a part of the present disclosure. Illustrative implementations of the present disclosure and descriptions thereof are intended to explain the present disclosure, but not constitute an inappropriate limitation to the present disclosure. In the drawings:

FIG. 4 is a second schematic diagram of a time domain position according to an implementation of the present disclosure.

FIG. 5 is a second schematic flowchart of a method for determining an HARQ codebook according to an implementation of the present disclosure.

FIG. 6 is a first schematic diagram of structure composition of an apparatus for determining an HARQ codebook according to an implementation of the present disclosure.

DETAILED DESCRIPTION

Technical solutions in implementations of the present disclosure will be described below with reference to the drawings in the implementations of the present disclosure. It is apparent that the implementations described are a part of the implementations of the present disclosure, but not all of the implementations of the present disclosure. According to the implementations of the present disclosure, all other implementations achieved by a person of ordinary skills in the art without making inventive efforts belong to the protection scope of the present disclosure.

The technical solutions of the implementations of the present disclosure may be applied to various communication systems, such as a global system of mobile communication (GSM) system, a code division multiple access (CDMA) system, a wideband code division multiple access (WCDMA) system, a general packet radio service (GPRS), a long term evolution (LTE) system, a LTE frequency division duplex (FDD) system, a LTE time division duplex (TDD) system, an advanced long term evolution (LTE-A) system, a new radio (NR) system, an evolution system of an NR system, a LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, wireless local area networks (WLAN), wireless fidelity (WiFi), a next generation communication system or other communication systems, etc.

Generally speaking, traditional communication systems support a limited quantity of connections and are easy to implement. However, with the development of communication technology, mobile communication systems will not only support traditional communication, but also support, for example, device to device (D2D) communication, machine to machine (M2M) communication, machine type communication (MTC), vehicle to vehicle (V2V) communication, and the implementations of the present disclosure may also be applied to these communication systems.

The system architectures and service scenarios described in the implementations of the present disclosure are used for explaining technical solutions of the implementations of the present disclosure more clearly, but do not constitute a limitation to the technical solutions provided by the implementations of the present disclosure. Those of ordinary skills in the art can know that with evolving of network architectures and emerging of new service scenarios, technical solutions provided by the implementations of the present disclosure are also applicable to similar technical problems.

Figure 1:
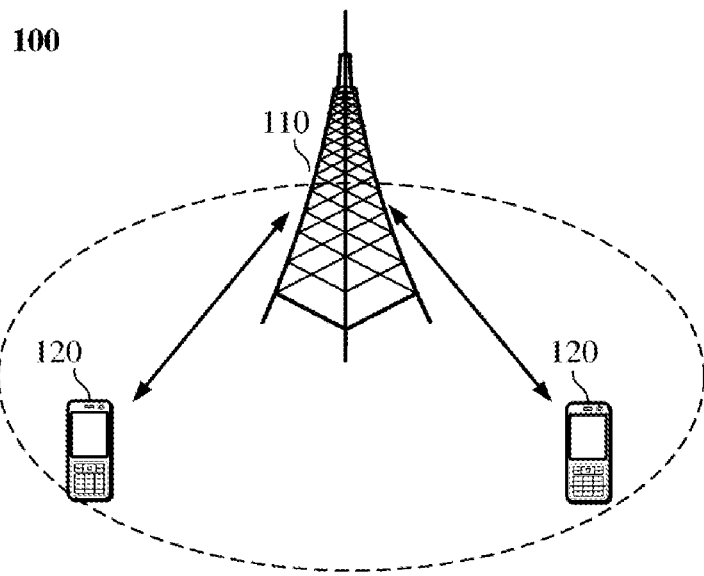
FIG. 1 is a schematic diagram of architecture of a communication system according to an implementation of the present disclosure.

Illustratively, a communication system 100 applied in an implementation of the present disclosure is shown in FIG. 1. The communication system 100 may include a network device 110. The network device 110 may be a device that communicates with terminals 120 (or referred to as communication terminals, or terminals). The network device 110 may provide communication coverage for a specific geographical area, and may communicate with a terminal located within the coverage area. Optionally, the network device 110 may be an Evolutional Node B (eNB or eNodeB) in an LTE system, or a radio controller in a Cloud Radio Access Network (CRAN), or the network device may be a mobile switching center, a relay station, an access point, a vehicle-mounted device, a wearable device, a hub, a switch, a bridge, a router, a network side device in a 5G network, or a network device in a future communication system, etc.

The communication system 100 further includes at least one terminal 120 located within the coverage area of the network device 110. The "terminal" as used herein includes, but is not limited to, an apparatus configured to receive/send a communication signal via a wired circuit connection, for example, via a connection of Public Switched Telephone Networks (PSTN), a Digital Subscriber Line (DSL), a digital cable, or a direct cable; and/or another data connection/network; and/or via a wireless interface, for instance, for a cellular network, a Wireless Local Area Network (WLAN), a digital television network such as a DVB-H network, a satellite network, or an AM-FM broadcast sender; and/or another terminal; and/or an Internet of Things (IoT) device. A terminal configured to communicate via a wireless interface may be referred to as "a wireless communication terminal", "a wireless terminal", or "a mobile terminal". Examples of the mobile terminal include, but are not limited to, a satellite or cellular phone; a Personal Communications System (PCS) terminal which may combine a cellular radio phone with data processing, facsimile, and data communication abilities; a Personal Digital Assistant (PDA) that may include a radio phone, a pager, internet/intranet access, a Web browser, a memo pad, a calendar, and/or, a Global Positioning System (GPS) receiver; and a conventional laptop and/or palmtop receiver, or another electronic apparatus including a radio phone transceiver. The terminal may refer to an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a PDA, a handheld device with a wireless communication function, a computing device, or another processing device connected to a wireless modem, a vehicle-mounted device, a wearable device, a terminal in a 5G network, or a terminal in a future evolved PLMN, etc.

Optionally, Device to Device (D2D) communication may be performed between the terminals 120.

Optionally, the 5G communication system or 5G network may also be referred to as a New Radio (NR) system or an NR network FIG. 1 illustrates one network device and two terminals. Optionally, the communication system 100 may include multiple network devices, and another quantity of terminals may be included within the coverage area of each network device, which is not limited in the implementations of the present disclosure.

Optionally, the communication system 100 may also include another network entity, such as a network controller, a mobile management entity, or the like, which is not limited in the implementations of the present disclosure.

It should be understood that a device with a communication function in a network/system in the implementations of the present disclosure may be referred to as a communication device. Taking the communication system 100 shown in FIG. 1 as an example, the communication device may include a network device 110 and terminals 120 which have communication functions, and the network device 110 and the terminals 120 may be the specific devices described above, which will not be repeated here again. The communication device may also include another device in the communication system 100, such as another network entity, such as a network controller, a mobile management entity, etc., which is not limited in the implementations of the present disclosure.

It should be understood that the terms "system" and "network" are often used interchangeably herein. The term "and/or" herein is an association relationship describing associated objects only, indicating that three relationships may exist, for example, A and/or B may indicate three cases: A alone, both A and B, and B alone. In addition, the symbol "/" in this document generally indicates that objects before and after the symbol "/" have an "or" relationship.

In order to facilitate understanding of technical solutions of the implementations of the present disclosure, the related art of the implementations of the present disclosure are described below, and as alternative solutions, the following related art may be arbitrarily combined with the technical solutions of the implementations of the present disclosure, which should be subject to the protection scope of the implementations of the present disclosure.

An unlicensed spectrum is a spectrum classified by countries and regions that can be used for communication of radio devices. This spectrum is generally regarded as a shared spectrum, that is, communication devices in different communication systems can use this spectrum without applying for an exclusive spectrum authority from the government, as long as the regulatory requirements set by countries or regions on this spectrum are met by the communication devices.

In order to enable various communication systems using an unlicensed spectrum for wireless communication to coexist friendly on this spectrum, some countries or regions have stipulated the legal requirements that must be met for using an unlicensed spectrum. For example, the communication devices follow a "Listen Before Talk (LBT)" principle, that is, before transmitting signals on a channel of the unlicensed spectrum, a communication device needs to conduct channel sensing first, and the communication device can transmit signals only when a result of the channel sensing is that the channel is idle. If the result of the channel sensing by the communication device on the unlicensed spectrum channel is that the channel is busy, the communication device cannot transmit signals. In order to ensure fairness, in one transmission, a duration of signal transmission by a communication device using the channel on the unlicensed spectrum may not exceed a Maximum Channel Occupancy Time (MCOT).

Several basic concepts of signal transmission on unlicensed spectrum are described below.

Maximum channel occupancy time (MCOT) refers to a maximum time length allowed for signal transmission using a channel of an unlicensed spectrum after LBT succeeds, and there are different MCOTs under different channel access priorities. At present, the maximum value of MCOT is 10 ms. It should be understood that the MCOT is the time occupied by the signal transmission.

Channel occupancy time (COT) refers to a time length of signal transmission using a channel of an unlicensed spectrum after LBT succeeds, wherein a channel may be occupied by a signal within the time length discontinuously. A maximum length of one COT cannot exceed 20 ms, and the time length occupied by signal transmission within the COT does not exceed the MCOT.

gNB-initiated COT, also called COT initiated by a base station, refers to one channel occupancy time obtained by the base station after LBT succeeds. In addition to downlink transmission, the gNB-initiated COT may also be used for uplink transmission by a terminal device under a certain condition.

Channel occupancy time of a terminal device (UE-initiated COT), also called COT initiated by the terminal device, refers to one channel occupancy time obtained by the terminal device after LBT succeeds.

Downlink burst (DL burst) refers to one group of downlink transmissions (i.e., including one or more downlink transmissions) performed by a base station, wherein the group of downlink transmissions are continuous transmissions (i.e., there are no gaps between the multiple downlink transmissions), or the group of downlink transmissions have a gap therebetween but the gap is less than or equal to 16 μs. If a gap between two downlink transmissions performed by the base station is greater than 16 µs, it is considered that the two downlink transmissions belong to two DL bursts.

Uplink burst (UL burst) refers to one group of uplink transmissions (i.e., including one or more uplink transmissions) performed by a terminal device, wherein the group of uplink transmissions are continuous transmissions (i.e., there are no gaps between the multiple uplink transmissions), or the group of uplink transmissions have a gap therebetween but the gap is less than or equal to 16 µs. If a gap between two uplink transmissions performed by the terminal device is greater than 16 µs, it is considered that the two uplink transmissions belong to two UL bursts.

An NR system supports dynamic determination of HARQ feedback timing. A base station schedules a terminal device to receive a PDSCH through Downlink Control Information (DCI), wherein the DCI includes indication information of a PUCCH resource for transmitting HARQ information corresponding to the PDSCH. Optionally, the indication information includes:

PUCCH resource indicator information: used for determining the PUCCH resource;

HARQ timing indicator (PDSCH-to-HARQ_feedback timing indicator) information: used for dynamically determining a time domain position of the PUCCH resource, wherein the HARQ timing indicator information is used for determining values in a preconfigured HARQ timing set. For example, when the HARQ timing indicator information is 000, it indicates the value 1 in the HARQ timing set, when the HARQ timing indicator information is 001, it indicates the value 2 in the HARQ timing set, and so on.

Further, in a case of dynamic codebook feedback, the DCI may further include the following information:

Downlink Assignment Index (DAI) information, the DAI information includes DAI count information and/or DAI total number information, wherein the DAI count information is used for indicating which PDSCH in a current HARQ feedback window is currently scheduled, and the DAI total number information is used for indicating how many PDSCHs are scheduled in total in the current HARQ feedback window.

According to the above information, the terminal device may determine a PUCCH resource for feeding back the HARQ information and a position of the HARQ information in a codebook transmitted on the PUCCH resource.

When an NR system is applied to an unlicensed frequency band, it may support independent network deployment, that is, it provides auxiliary services without relying on carriers on the licensed frequency band. In this scenario, after receiving a PDSCH on an unlicensed carrier, the terminal device needs to send HARQ feedback corresponding to the PDSCH on the unlicensed carrier.

On the unlicensed frequency band, the HARQ timing indicator information may be used not only to determine a PUCCH time domain resource for transmitting HARQ information corresponding to the PDSCH, but also to indicate a state in which the HARQ information corresponding to the PDSCH will not be fed back temporarily. For example, the preconfigured HARQ timing set includes a value $k_L$ indicating an invalid resource indicator, and when the HARQ timing indicator information is 111, it indicates $k_L$ in the HARQ timing set, indicating that the corresponding PUCCH resource cannot be determined temporarily.

In addition, in order to flexibly feed back HARQ information corresponding to a PDSCH on the unlicensed frequency band, the base station may group scheduled PDSCHs and indicate grouping information of the PDSCHs through explicit signaling, so that a terminal device performs corresponding HARQ feedback according to different groups after receiving the PDSCHs. If a certain group of HARQ information of the terminal device fails to be transmitted due to an LBT failure in a certain transmission, or the base station fails to detect a certain group of HARQ information expected to be transmitted by the terminal device on a certain PUCCH resource, the base station may trigger, through DCI, the terminal device to retransmit that group of HARQ information. When retransmitting a certain group of HARQ information, the terminal device may keep a same codebook size as that in an initial transmission, and may also add new HARQ information during retransmitting.

The terminal device needs to perform HARQ feedback according to the grouping of the base station, but the grouping rule of the base station is not limited. Thus, for the terminal device, there may be a case that for PDSCHs in a certain group of PDSCHs, feedback cannot be performed in time on the PUCCH feedback resource corresponding to the group of PDSCHs, and may also be a case that PDSCHs for which the HARQ timing indicator information indicates a valid PUCCH resource and PDSCHs for which the HARQ timing indicator information indicates an invalid PUCCH resource are divided into the same group. In such cases, how the terminal device determines the codebook for HARQ feedback is not clear. To this end, the following technical solutions of the implementations of the present disclosure are proposed.

Figure 2:
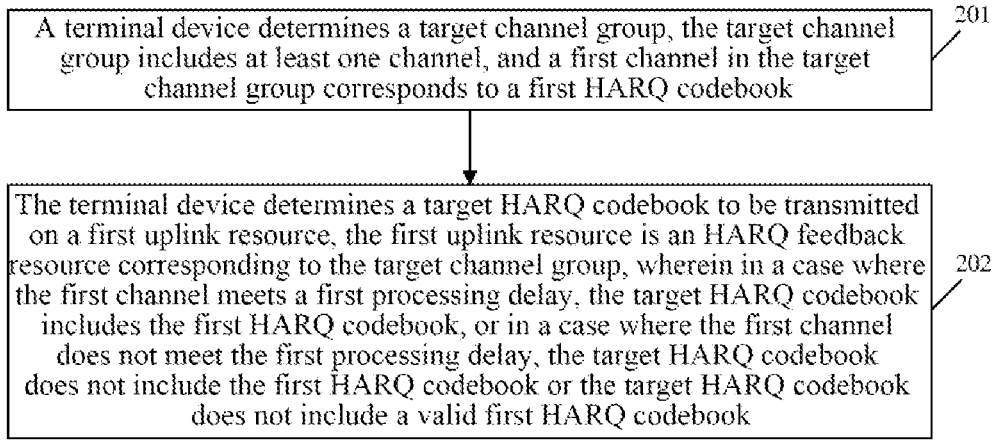
FIG. 2 is a first schematic flowchart of a method for determining an HARQ codebook according to an implementation of the present disclosure.

FIG. 2 is a first schematic flowchart of a method for determining an HARQ codebook according to an implementation of the present disclosure. As shown in FIG. 2, the method for determining an HARQ codebook includes at least part of act 201 and act 202.

In act 201, a terminal device determines a target channel group, the target channel group includes at least one channel, and a first channel in the target channel group corresponds to a first HARQ codebook.

In an optional implementation, a channel included in the target channel group is a PDSCH, wherein the target channel group may include one or more PDSCHs.

In an implementation of the present disclosure, each channel in the target channel group corresponds to one HARQ codebook, and the HARQ codebook is used for carrying feedback information of the corresponding channel. For a first channel in the target channel group, the first channel corresponds to the first HARQ codebook.

In an optional implementation, each channel in the target channel group is scheduled by one DCI. In an example, the base station sends at least one DCI (for scheduling one group of PDSCHs), wherein each DCI is used for scheduling one PDSCH, and further, the DCI carries indication information of a PUCCH resource for feeding back HARQ information corresponding to the PDSCH, such as HARQ timing indicator information. Here, the HARQ timing indicator information may be used to determine a time domain position of a PUCCH resource of the HARQ information corresponding to the PDSCH, and may also be used to indicate that the HARQ information corresponding to the PDSCH is not fed back temporarily.

In an implementation of the present disclosure, the base station may group scheduled PDSCHs and indicate grouping information of the PDSCHs through explicit signaling, so that the terminal device performs corresponding HARQ feedback according to different groups after receiving the PDSCHs. Optionally, the base station indicates the grouping information of the PDSCHs in the DCI for scheduling the PDSCHs.

In act 202, the terminal device determines a target HARQ codebook to be transmitted on a first uplink resource, the first uplink resource being an HARQ feedback resource corresponding to the target channel group, wherein in the case where the first channel meets a first processing delay, the target HARQ codebook includes the first HARQ codebook, or in the case where the first channel does not meet the first processing delay, the target HARQ codebook does not include the first HARQ codebook or the target HARQ codebook does not include a valid first HARQ codebook.

In an optional implementation, the base station may transmit multiple channels (i.e., the target channel group) to the terminal device in a DL burst in the COT initiated by the base station. In order to enable the HARQ information (i.e., the target HARQ codebook) corresponding to the multiple channels to be fed back to the base station as soon as possible, the base station may indicate the terminal device to feed back the HARQ information (i.e., the target HARQ codebook) corresponding to the DL burst on a first uplink resource after the DL burst ends. If the first uplink resource belongs to the COT initiated by the base station, and a gap between a start position of the first uplink resource and an end position of the DL burst is less than or equal to a preset value (such as 16 μs), the terminal device may feed back the HARQ information (i.e., the target HARQ codebook) directly on the first uplink resource after the gap ends. Alternatively, if the first uplink resource belongs to the COT initiated by the base station, and the gap between the start position of the first uplink resource and the end position of the DL burst is greater than the preset value (such as 16 μs), the terminal device may perform a single-slot LBT in the gap and feed back the HARQ information (i.e., the target HARQ codebook) on the first uplink resource after the LBT succeeds. However, for a channel (e.g., the first channel) scheduled near the end position in the DL burst, it may be very difficult for the terminal device to perform corresponding HARQ feedback immediately on the first uplink resource due to the limitation of processing capability. In order to determine the size of the target HARQ codebook, whether the first channel meets the first processing delay needs to be considered. Specifically, in the case where the first channel meets the first processing delay, the target HARQ codebook includes the first HARQ codebook, or in the case where the first channel does not meet the first processing delay, the target HARQ codebook does not include the first HARQ codebook or the target HARQ codebook does not include a valid first HARQ codebook.

In an optional implementation, the first processing delay is determined according to at least one of processing capability of the terminal device, a position of the first channel and a position of the first uplink resource.

In an optional implementation, whether the first channel meets the first processing delay is determined according to at least one of processing capability of the terminal device, a position of the first channel and a position of the first uplink resource.

In an optional implementation, the first channel at least includes a last channel in the target channel group.

In an optional implementation, the first channel includes last multiple channels in the target channel group.

In an implementation of the present disclosure, the HARQ timing indicator information corresponding to the first channel may indicate that feedback is not performed temporarily or indicate the first uplink resource, and how to determine the target HARQ codebook will be described below for these two cases.

(1) The HARQ timing indicator information corresponding to the first channel indicates that feedback is not performed temporarily.

In such a case, the determination of the target HARQ codebook includes at least one of A1) and B1).

A1) In the case where the first channel meets the first processing delay, the target HARQ codebook includes the first HARQ codebook, and the first HARQ codebook is set as a negative acknowledgement (NACK) or placeholder information.

B1) In the case where the first channel does not meet the first processing delay, the target HARQ codebook does not include the first HARQ codebook.

(2) The HARQ timing indicator information corresponding to the first channel indicates the first uplink resource.

In such a case, the determination of the target HARQ codebook includes at least one of A2) and B2).

A2) In the case where the first channel meets the first processing delay, the target HARQ codebook includes the first HARQ codebook, and the first HARQ codebook is used for carrying HARQ information of the first channel Optionally, the first HARQ codebook is determined according to a decoding situation of the first channel B2) In the case where the first channel does not meet the first processing delay, the target HARQ codebook does not include a valid first HARQ codebook. Specifically, the target HARQ codebook includes the first HARQ codebook, and the first HARQ codebook is set as NACK or placeholder information, or the target HARQ codebook does not include the first HARQ codebook.

In an optional implementation, the target HARQ codebook determined in any one of the above three modes A1), B1) and B2) does not include a valid first HARQ codebook, or does not include HARQ feedback information determined according to the decoding situation of the first channel Therefore, the terminal device determines a second uplink resource according to first indication information. The second uplink resource is used for transmitting the first HARQ codebook, wherein the first HARQ codebook is a valid first HARQ codebook, or the first HARQ codebook is determined according to the decoding situation of the first channel.

In an optional implementation, a resource for transmitting the first indication information in the above solution is located after the first uplink resource.

The technical solutions of the implementations of the present disclosure will be illustrated below with reference to specific application examples.

Figure 3:
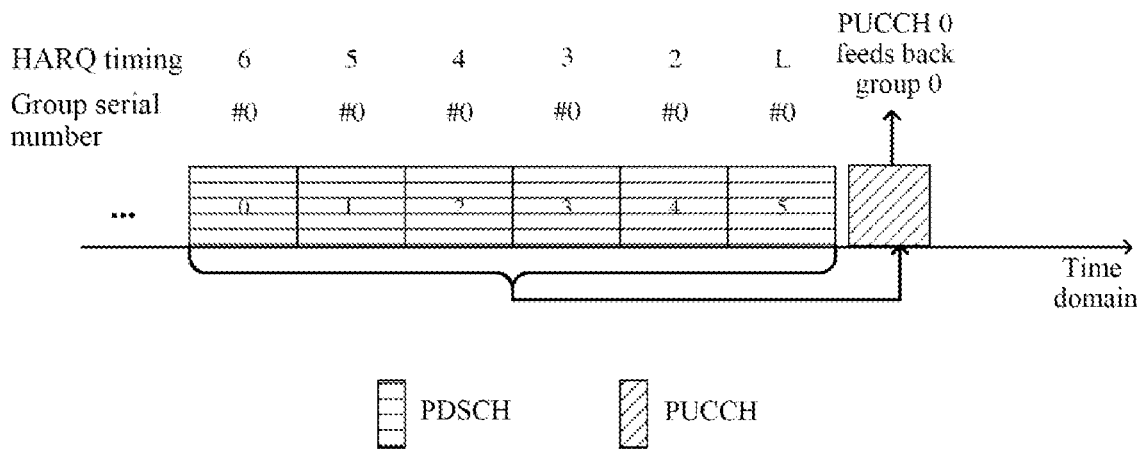
FIG. 3 is a first schematic diagram of a time domain position according to an implementation of the present disclosure.

When grouping channels, the base station divides the channels for which feedback resources cannot be determined temporarily and the channels for which feedback can be performed normally into one group, and does not indicate the time domain position of PUCCH resources for the channels for which feedback cannot be performed temporarily (i.e., the HARQ timing indicator information corresponding to the channels indicates that feedback is not performed temporarily, or the HARQ timing indicator information is invalid). As shown in FIG. 3, the base station schedules 6 PDSCHs for the terminal device in one DL burst, the 6 PDSCHs belong to the same group, i.e., group 0, and the feedback resource indicated by the HARQ timing indicator information corresponding to the first, second, third, fourth and fifth PDSCHs among the 6 PDSCHs is PUCCH 0. For the 6th PDSCH, i.e., PDSCH 5, the base station indicates that feedback is not performed temporarily in the HARQ timing indicator information corresponding to the PDSCH (i.e., the feedback resource corresponding to the PDSCH is undetermined temporarily). The HARQ codebook transmitted on PUCCH 0 includes HARQ information corresponding to the PDSCHs in group 0. The HARQ codebook corresponding to the PDSCHs in group 0 included in the HARQ codebook transmitted on PUCCH 0 may include at least one of the following cases.

(I) For the first PDSCH (i.e., PDSCH 5 in FIG. 3) in the group for which the HARQ timing indicator information indicates that feedback is not performed temporarily, if the first PDSCH meets the first processing delay, wherein whether the first PDSCH meets the first processing delay is determined according to at least one of the processing capability of the terminal device, the position of the first PDSCH and the position of PUCCH resource 0. For example, the distance between the end position of the first PDSCH and the start position of PUCCH resource 0 is greater than or equal to the first processing delay, then it can be considered that the first PDSCH meets the first processing delay, wherein the first processing delay is determined according to the processing capability of the terminal device. Correspondingly, the HARQ codebook transmitted on PUCCH resource 0 includes an HARQ codebook corresponding to the first PDSCH. Optionally, the first PDSCH is the last PDSCH or the last continuous multiple PDSCHs in this transmission burst. Optionally, since the HARQ timing indicator information corresponding to the first PDSCH indicates that feedback is not performed temporarily, the HARQ codebook corresponding to the first PDSCH is set as NACK or placeholder information, referring to Table 1 below.

TABLE 1

| PDSCH 0 | | PDSCH 1 | | PDSCH 2 | |
|---|---|---|---|---|---|
| Codeword 0 | Codeword 1 | Codeword 0 | Codeword 1 | Codeword 0 | Codeword 1 |
| PDSCH 3 | | PDSCH 4 | | PDSCH 5 | |
| Codeword 0 | Codeword 1 | Codeword 0 | Codeword 1 | NACK | NACK |

(II) For the first PDSCH (i.e., PDSCH 5 in FIG. 3) in the group for which the HARQ timing indicator information indicates that feedback is not performed temporarily, if the first PDSCH does not meet the first processing delay, wherein whether the first PDSCH meets the first processing delay is determined according to at least one of the processing capability of the terminal device, the position of the first PDSCH and the position of PUCCH resource 0. For example, the distance between the end position of the first PDSCH and the start position of PUCCH resource 0 is smaller than the first processing delay, then it can be considered that the first PDSCH does not meet the first processing delay, wherein the first processing delay is determined according to the processing capability of the terminal device. Correspondingly, the HARQ codebook transmitted on PUCCH resource 0 does not include an HARQ codebook corresponding to the first PDSCH, referring to Table 2 below. Optionally, the first PDSCH is the last PDSCH or the last continuous multiple PDSCHs in this transmission burst.

TABLE 2

| PDSCH 0 | | PDSCH 1 | | PDSCH 2 | |
|---|---|---|---|---|---|
| Codeword 0 | Codeword 1 | Codeword 0 | Codeword 1 | Codeword 0 | Codeword 1 |
| PDSCH 3 | | | PDSCH 4 | | |
| Codeword 0 | Codeword 1 | | Codeword 0 | Codeword 1 | |

In addition to the above two cases where the HARQ timing indicator information corresponding to the first channel indicates that feedback is not performed temporarily, there may be also the following two cases where the HARQ timing indicator information corresponding to the first channel indicates valid uplink resources.

(III) For the first PDSCH in the group for which the HARQ timing indicator information indicates a valid PUCCH resource (assuming that PDSCH 5 in FIG. 3 is the first PDSCH and the corresponding HARQ timing indicator information indicates 1), if the first PDSCH meets the first processing delay, wherein whether the first PDSCH meets the first processing delay is determined according to at least one of the processing capability of the terminal device, the position of the first PDSCH and the position of PUCCH resource 0. For example, the distance between the end position of the first PDSCH and the start position of PUCCH resource 0 is greater than or equal to the first processing delay, then it can be considered that the first PDSCH meets the first processing delay, wherein the first processing delay is determined according to the processing capability of the terminal device. Correspondingly, the HARQ codebook transmitted on PUCCH resource 0 includes the HARQ codebook corresponding to the first PDSCH, and the HARQ codebook corresponding to the first PDSCH is determined according to the decoding situation of the first PDSCH, referring to Table 3 below. Optionally, the first PDSCH is the last PDSCH or the last continuous multiple PDSCHs in this transmission burst.

or public DCI information. Optionally, the first indication information is received after feedback resource PUCCH 0.

According to the method for determining an HARQ codebook in an implementation of the present disclosure, when there is the case that for PDSCHs in a certain group of PDSCHs, feedback cannot be performed in time on the PUCCH feedback resource corresponding to the group of PDSCHs, or the case that for PDSCHs for which the HARQ timing indicator information indicates a valid PUCCH resource and PDSCHs for which the HARQ timing indicator information indicates an invalid PUCCH resource are divided into the same group, the network device and the terminal device can have consistent understanding of the codebook size, thereby avoiding the problem that the network device cannot correctly receive the HARQ codebook on the uplink resource due to ambiguity in understanding.

TABLE 3

| PDSCH 0 | | PDSCH 1 | | PDSCH 2 | |
|---|---|---|---|---|---|
| Codeword 0 | Codeword 1 | Codeword 0 | Codeword 1 | Codeword 0 | Codeword 1 |
| PDSCH 3 | | PDSCH 4 | | PDSCH 5 | |
| Codeword 0 | Codeword 1 | Codeword 0 | Codeword 1 | Codeword 0 | Codeword 1 |

(IV) For the first PDSCH in the group for which the HARQ timing indicator information indicates a valid PUCCH resource (assuming that PDSCH 5 in FIG. 3 is the first PDSCH and the corresponding HARQ timing indicator information indicates 1), if the first PDSCH does not meet the first processing delay, wherein whether the first PDSCH meets the first processing delay is determined according to at least one of the processing capability of the terminal device, the position of the first PDSCH and the position of PUCCH resource 0. For example, the distance between the end position of the first PDSCH and the start position of PUCCH resource 0 is smaller than the first processing delay, then it can be considered that the first PDSCH does not meet the first processing delay, wherein the first processing delay is determined according to the processing capability of the terminal device. Correspondingly, the HARQ codebook transmitted on PUCCH resource 0 includes the HARQ codebook corresponding to the first PDSCH, and the HARQ codebook corresponding to the first PDSCH is set as NACK or placeholder information, referring to Table 1 above; or the HARQ codebook transmitted on PUCCH resource 0 does not include the HARQ codebook corresponding to the first PDSCH, referring to Table 2 above. Optionally, the first PDSCH is the last PDSCH or the last continuous multiple PDSCHs in this transmission burst.

Further, in an optional implementation, for any one of the three cases (I), (II) and (III) described above, as shown in FIG. 4, the terminal device determines that the feedback resource is PUCCH 1 according to the first indication information of the base station, and feeds back a first HARQ codebook corresponding to a first PDSCH (i.e., PDSCH 5) through PUCCH 1, wherein the first HARQ codebook is a valid first HARQ codebook; in other words, the first HARQ codebook is determined according to the decoding situation of the first PDSCH. Optionally, the first indication information may be downlink grant information, or uplink grant information, or other DCI information with the same length as downlink grant information or uplink grant information, FIG. 5 is a second schematic flowchart of a method for determining an HARQ codebook according to an implementation of the present disclosure. As shown in FIG. 5, the method for determining an HARQ codebook includes at least part of act 501 and act 502.

In act 501, the network device determines a first uplink resource, the first uplink resource is used for transmitting a target HARQ codebook corresponding to a target channel group, the target channel group includes at least one channel, and a first channel in the target channel group corresponds to a first HARQ codebook.

In an optional implementation, the network device is a base station, such as gNB.

In an optional implementation, the first uplink resource is a PUCCH resource.

In an optional implementation, a channel included in the target channel group is a PDSCH, wherein the target channel group may include one or more PDSCHs.

In an implementation of the present disclosure, each channel in the target channel group corresponds to one HARQ codebook, and the HARQ codebook is used for carrying feedback information of the corresponding channel. For a first channel in the target channel group, the first channel corresponds to the first HARQ codebook. For the target channel group, the target channel group corresponds to the target HARQ codebook.

In act 502, the network device determines the target HARQ codebook, wherein in the case where the first channel meets a first processing delay, the target HARQ codebook includes the first HARQ codebook, or in the case where the first channel does not meet the first processing delay, the target HARQ codebook does not include the first HARQ codebook or the target HARQ codebook does not include a valid first HARQ codebook.

In an optional implementation, taking a case as an example where the network device is a base station, the base station may transmit multiple channels (i.e., the target channel group) to the terminal device in a DL burst in the COT initiated by the base station. In order to enable the HARQ information (i.e., the target HARQ codebook) corresponding to the multiple channels to be fed back to the base station as soon as possible, the base station may indicate the terminal device to feed back the HARQ information (i.e., the target HARQ codebook) corresponding to the DL burst on a first uplink resource after the DL burst ends. If the first uplink resource belongs to the COT initiated by the base station, and a gap between a start position of the first uplink resource and an end position of the DL burst is less than or equal to a preset value (such as 16 µs), the terminal device may feed back the HARQ information (i.e., the target HARQ codebook) directly on the first uplink resource after the gap ends. Alternatively, if the first uplink resource belongs to the COT initiated by the base station, and the gap between the start position of the first uplink resource and the end position of the DL burst is greater than the preset value (such as 16 µs), the terminal device may perform a single-slot LBT in the gap and feed back the HARQ information (i.e., the target HARQ codebook) on the first uplink resource after the LBT succeeds. However, for a channel (e.g., the first channel) scheduled near the end position in the DL burst, it may be very difficult for the terminal device to perform corresponding HARQ feedback immediately on the first uplink resource due to the limitation of processing capability. In order to determine the size of the target HARQ codebook, whether the first channel meets the first processing delay needs to be considered. Specifically, in the case where the first channel meets the first processing delay, the target HARQ codebook includes the first HARQ codebook, or in the case where the first channel does not meet the first processing delay, the target HARQ codebook does not include the first HARQ codebook or the target HARQ codebook does not include a valid first HARQ codebook.

In an optional implementation, the first processing delay is determined according to at least one of processing capability of the terminal device, a position of the first channel and a position of the first uplink resource.

In an optional implementation, whether the first channel meets the first processing delay is determined according to at least one of processing capability of the terminal device, a position of the first channel and a position of the first uplink resource.

In an optional implementation, the first channel at least includes a last channel in the target channel group.

In an optional implementation, the first channel includes last multiple channels in the target channel group.

In an implementation of the present disclosure, the HARQ timing indicator information corresponding to the first channel may indicate that feedback is not performed temporarily or indicate the first uplink resource, and how to determine the target HARQ codebook will be described below for these two cases.

(1) The HARQ timing indicator information corresponding to the first channel indicates that feedback is not performed temporarily.

In such a case, the determination of the target HARQ codebook includes at least one of A1) and B1).

A1) In the case where the first channel meets the first processing delay, the target HARQ codebook includes the first HARQ codebook, and the first HARQ codebook is set as a negative acknowledgement (NACK) or placeholder information.

B1) In the case where the first channel does not meet the first processing delay, the target HARQ codebook does not include the first HARQ codebook.

(2) The HARQ timing indicator information corresponding to the first channel indicates the first uplink resource.

In such a case, the determination of the target HARQ codebook includes at least one of A2) and B2).

A2) In the case where the first channel meets the first processing delay, the target HARQ codebook includes the first HARQ codebook, and the first HARQ codebook is used for carrying HARQ information of the first channel Optionally, the first HARQ codebook is determined according to a decoding situation of the first channel.

B2) In the case where the first channel does not meet the first processing delay, the target HARQ codebook does not include a valid first HARQ codebook. Specifically, the target HARQ codebook includes the first HARQ codebook, and the first HARQ codebook is set as NACK or placeholder information, or the target HARQ codebook does not include the first HARQ codebook.

Further, in an optional implementation, the target HARQ codebook determined in any one of the above three modes A1), B1) and B2) does not include a valid first HARQ codebook, or does not include HARQ feedback information determined according to the decoding situation of the first channel Therefore, the terminal device determines a second uplink resource according to first indication information. The second uplink resource is used for transmitting the first HARQ codebook, wherein the first HARQ codebook is a valid first HARQ codebook, or the first HARQ codebook is determined according to the decoding situation of the first channel.

In an optional implementation, a resource for transmitting the first indication information in the above solution is located after the first uplink resource.

FIG. 6 is a first schematic diagram of structure composition of an apparatus for determining an HARQ codebook according to an implementation of the present disclosure. As shown in FIG. 6, the apparatus for determining an HARQ codebook includes: a first determining unit 601 and a second determining unit 602.

The first determining unit 601 is configured to determine a target channel group, the target channel group includes at least one channel, and a first channel in the target channel group corresponds to a first HARQ codebook.

The second determining unit 602 is configured to determine a target HARQ codebook to be transmitted on a first uplink resource, the first uplink resource being an HARQ feedback resource corresponding to the target channel group. Wherein, in the case where the first channel meets a first processing delay, the target HARQ codebook includes the first HARQ codebook, or in the case where the first channel does not meet the first processing delay, the target HARQ codebook does not include the first HARQ codebook or the target HARQ codebook does not include a valid first HARQ codebook.

In an optional implementation, the first processing delay is determined according to at least one of processing capability of the terminal device, a position of the first channel and a position of the first uplink resource.

In an optional implementation, whether the first channel meets the first processing delay is determined according to at least one of processing capability of the terminal device, a position of the first channel and a position of the first uplink resource.

In an optional implementation, the first channel at least includes a last channel in the target channel group.

In an optional implementation, the HARQ timing indicator information corresponding to the first channel indicates that feedback is not performed temporarily.

In an optional implementation, in the case where the first channel meets the first processing delay, the target HARQ codebook includes the first HARQ codebook, and the first HARQ codebook is set as a negative acknowledgement (NACK) or placeholder information; or, in the case where the first channel does not meet the first processing delay, the target HARQ codebook does not include the first HARQ codebook.

In an optional implementation, the HARQ timing indicator information corresponding to the first channel indicates the first uplink resource.

In an optional implementation, the target HARQ codebook not including a valid first HARQ codebook includes: the target HARQ codebook including the first HARQ codebook, and the first HARQ codebook being set as a negative acknowledgement (NACK) or placeholder information.

In an optional implementation, the apparatus further includes a third determining unit 603. The third determining unit 603 is configured to determine a second uplink resource according to the first indication information, the second uplink resource being used for transmitting the first HARQ codebook.

In an optional implementation, the resource where the first indication information is located is located after the first uplink resource.

Those skilled in the art should understand that the relevant description of the apparatus for determining an HARQ codebook in an implementation of the present disclosure may be understood with reference to the relevant description of the method for determining an HARQ codebook in an implementation of the present disclosure.

Figure 7:
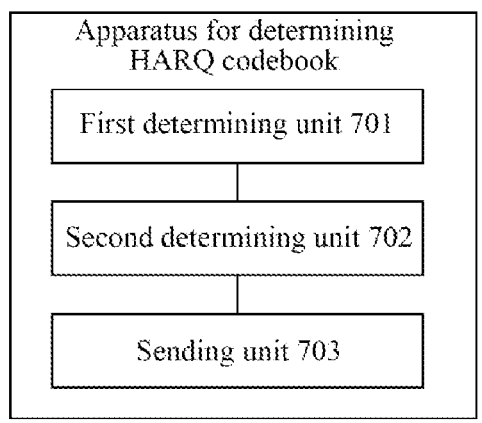
FIG. 7 is a second schematic diagram of structure composition of an apparatus for determining an HARQ codebook according to an implementation of the present disclosure.

FIG. 7 is a second schematic diagram of structure composition of an apparatus for determining an HARQ codebook according to an implementation of the present disclosure. As shown in FIG. 7, the apparatus for determining an HARQ codebook includes: a first determining unit 701 and a second determining unit 702.

The first determining unit 701 is configured to determine a first uplink resource, the first uplink resource is used for transmitting a target HARQ codebook corresponding to a target channel group, the target channel group includes at least one channel, and a first channel in the target channel group corresponds to a first HARQ codebook.

The second determining unit 702 is configured to determine the target HARQ codebook, wherein in the case where the first channel meets a first processing delay, the target HARQ codebook includes the first HARQ codebook, or in the case where the first channel does not meet the first processing delay, the target HARQ codebook does not include the first HARQ codebook or the target HARQ codebook does not include a valid first HARQ codebook.

In an optional implementation, the first processing delay is determined according to at least one of processing capability of the terminal device, a position of the first channel and a position of the first uplink resource.

In an optional implementation, whether the first channel meets the first processing delay is determined according to at least one of processing capability of the terminal device, a position of the first channel and a position of the first uplink resource.

In an optional implementation, the first channel at least includes a last channel in the target channel group.

In an optional implementation, the HARQ timing indicator information corresponding to the first channel indicates that feedback is not performed temporarily.

In an optional implementation, in the case where the first channel meets the first processing delay, the target HARQ codebook includes the first HARQ codebook, and the first HARQ codebook is set as a negative acknowledgement (NACK) or placeholder information; or, in the case where the first channel does not meet the first processing delay, the target HARQ codebook does not include the first HARQ codebook.

In an optional implementation, the HARQ timing indicator information corresponding to the first channel indicates the first uplink resource.

In an optional implementation, the target HARQ codebook not including a valid first HARQ codebook includes: the target HARQ codebook including the first HARQ codebook, and the first HARQ codebook being set as a negative acknowledgement (NACK) or placeholder information.

In an optional implementation, the apparatus further includes a sending unit 703.

The sending unit 703 is configured to send first indication information, the first indication information being used for determining a second uplink resource, the second uplink resource being used for transmitting the first HARQ codebook.

In an optional implementation, the resource where the first indication information is located is located after the first uplink resource.

Those skilled in the art should understand that the relevant description of the HARQ codebook determining apparatus in an implementation of the present disclosure may be understood with reference to the relevant description of the HARQ codebook determining method in an implementation of the present disclosure.

Figure 8:
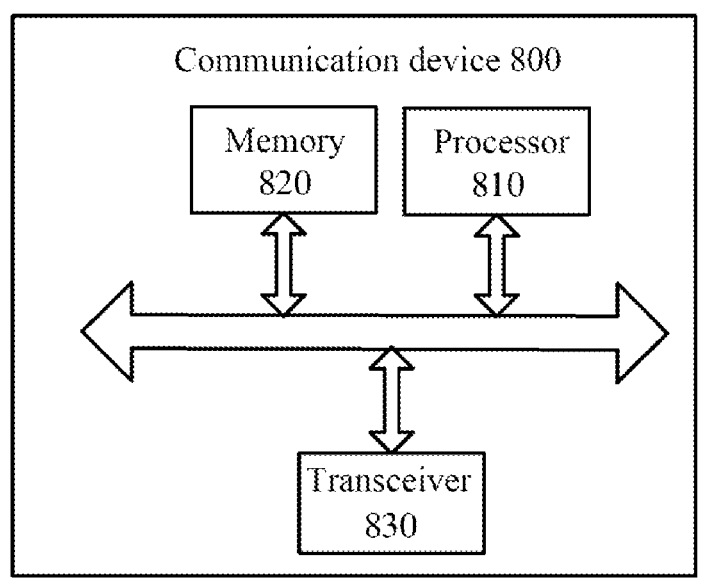
FIG. 8 is a schematic structural diagram of a communication device according to an implementation of the present disclosure.

FIG. 8 is a schematic structural diagram of a communication device 800 according to an implementation of the present disclosure. The communication device may be a terminal device or a network device. The communication device 800 shown in FIG. 8 includes a processor 810, which may call and run a computer program from a memory to implement the methods in the implementations of the present disclosure.

Optionally, as shown in FIG. 8, the communication device 800 may further include a memory 820. The processor 810 may call and run a computer program from the memory 820 to implement the methods in the implementations of the present disclosure.

The memory 820 may be a separate device independent of the processor 810, or may be integrated in the processor 810.

Optionally, as shown in FIG. 8, the communication device 800 may further include a transceiver 830, and the processor 810 may control the transceiver 830 to communicate with other devices. Specifically, the transceiver 830 may send information or data to other devices or receive information or data sent by other devices.

The transceiver 830 may include a transmitter and a receiver. The transceiver 830 may further include antennas, the number of which may be one or more.

Optionally, the communication device 800 may be specifically the network device in an implementation of the present disclosure, and the communication device 800 may implement the corresponding processes implemented by the network device in various methods in the implementations of the present disclosure, which will not be repeated here for brevity.

Optionally, the communication device 800 may be specifically the mobile terminal/terminal device in an implementation of the present disclosure, and the communication device 800 may implement the corresponding processes implemented by the mobile terminal/terminal device in various methods in the implementations of the present disclosure, which will not be repeated here for brevity.

Figure 9:
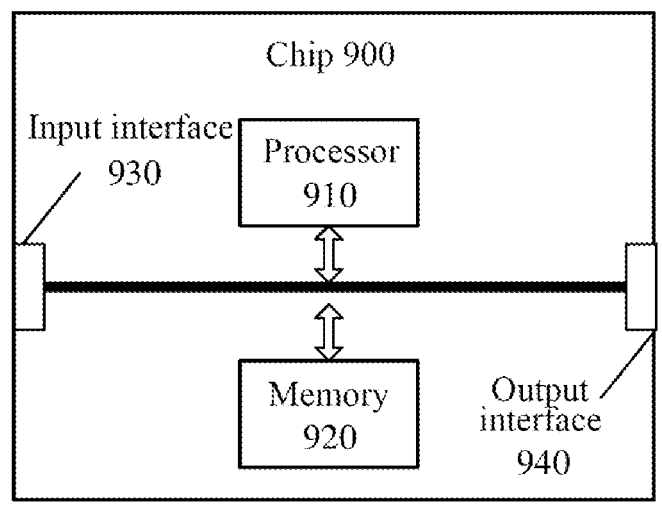
FIG. 9 is a schematic structural diagram of a chip according to an implementation of the present disclosure.

FIG. 9 is a schematic structural diagram of a chip according to an implementation of the present disclosure. The chip 900 shown in FIG. 9 includes a processor 910, which may call and run a computer program from a memory to implement the methods in the implementations of the present disclosure.

Optionally, as shown in FIG. 9, the chip 900 may further include a memory 920. The processor 910 may call and run a computer program from the memory 920 to implement the methods in the implementations of the present disclosure.

The memory 920 may be a separate device independent of the processor 910, or may be integrated in the processor 910.

Optionally, the chip 900 may further include an input interface 930. The processor 910 may control the input interface 930 to communicate with other devices or chips, specifically, may acquire information or data sent by other devices or chips.

Optionally, the chip 900 may further include an output interface 940. The processor 910 may control the output interface 940 to communicate with other devices or chips, specifically, may output information or data to other devices or chips.

Optionally, the chip may be applied to the network device in the implementations of the present disclosure, and the chip may implement the corresponding processes implemented by the network device in the various methods in the implementations of the present disclosure, which will not be repeated here for brevity.

Optionally, the chip may be applied to the mobile terminal/terminal device in the implementations of the present disclosure, and the chip may implement the corresponding processes implemented by the mobile terminal/terminal device in the various methods in the implementations of the present disclosure, which will not be repeated here for brevity.

It should be understood that the chip mentioned in the implementations of the present disclosure may also be referred to as a system-level chip, a system chip, a chip system or a system chip on chip, etc.

Figure 10:
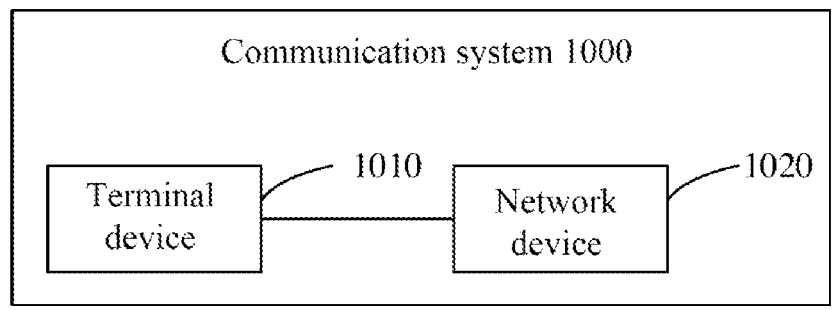
FIG. 10 is a schematic block diagram of a communication system according to an implementation of the present disclosure.

FIG. 10 is a schematic block diagram of a communication system 1000 according to an implementation of the present disclosure. As shown in FIG. 10, the communication system 1000 includes a terminal device 1010 and a network device 1020.

The terminal device 1010 may be used for implementing the corresponding functions implemented by the terminal device in the above-mentioned methods, and the network device 1020 may be used for implementing the corresponding functions implemented by the network device in the above-mentioned methods, which will not be repeated here for brevity.

It should be understood that the processor in an implementation of the present disclosure may be an integrated circuit chip with a capability of processing signals. In the implementation process, the actions of the method implementations described above may be completed by integrated logic circuits of hardware in the processor or instructions in the form of software. The above processor may be a general purpose processor, a Digital Signal Processor (DSP), an Application Specific Integrated Circuit (ASIC), a Field Programmable Gate Array (FPGA), or other programmable logic device, discrete gate or transistor logic device, or discrete hardware component. The processor may implement or perform various methods, acts and logic block diagrams disclosed in implementations of the present disclosure. The general purpose processor may be a microprocessor or the processor may be any conventional processor or the like. The acts of the method disclosed in connection with the implementations of the present disclosure may be directly embodied as being executed by a hardware decoding processor, or by a combination of hardware and software modules in the decoding processor. The software modules may be located in a mature storage medium in the art, such as a random access memory, a flash memory, a read-only memory, a programmable read-only memory or an electrically erasable programmable memory, or a register. The storage medium is located in the memory, and the processor reads information from the memory and completes the acts of the above methods in combination with its hardware.

It should be understood that the memory in the implementations of the present disclosure may be a transitory memory or a non-transitory memory, or may include both a transitory and a non-transitory memory. The non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM) which serves as an external cache. As an example, but not as a limitation, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memories of the systems and methods described herein are intended to include, but are not limited to, these and any other suitable types of memories.

It should be understood that, the foregoing memories are examples for illustration and should not be construed as limiting. For example, the memory in the implementations of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a Direct Rambus RAM (DR RAM), or the like. That is, memories in the implementations of the present disclosure are intended to include, but are not limited to, these and any other suitable types of memories.

An implementation of the present disclosure further provides a computer-readable storage medium, configured to store a computer program.

Optionally, the computer-readable storage medium may be applied to the network device in the implementations of the present disclosure, and the computer program causes a computer to perform the corresponding processes implemented by the network device in various methods in the implementations of the present disclosure, which will not be repeated here for brevity.

Optionally, the computer-readable storage medium may be applied to the mobile terminal/terminal device in the implementations of the present disclosure, and the computer program causes a computer to perform the corresponding processes implemented by the mobile terminal/terminal device in various methods in the implementations of the present disclosure, which will not be repeated here for brevity.

An implementation of the present disclosure further provides a computer program product, including computer program instructions.

Optionally, the computer program product may be applied to the network device in the implementations of the present disclosure, and the computer program instructions cause a computer to perform the corresponding processes implemented by the network device in various methods in the implementations of the present disclosure, which will not be repeated here for brevity.

Optionally, the computer program product may be applied to the mobile terminal/terminal device in the implementations of the present disclosure, and the computer program instructions cause a computer to perform the corresponding processes implemented by the mobile terminal/terminal device in various methods in the implementations of the present disclosure, which will not be repeated here for brevity.

An implementation of the present disclosure further provides a computer program.

Optionally, the computer program may be applied to the network device in the implementations of the present disclosure. The computer program, when run on a computer, causes the computer to perform the corresponding processes implemented by the network device in various methods in the implementations of the present disclosure, which will not be repeated here for brevity.

Optionally, the computer program may be applied to the mobile terminal/terminal device in the implementations of the present disclosure. The computer program, when run on a computer, causes the computer to perform the corresponding processes implemented by the mobile terminal/terminal device in various methods in the implementations of the present disclosure, which will not be repeated here for brevity.

Those of ordinary skills in the art will recognize that the exemplary units and algorithm acts described in connection with the implementations disclosed herein may be implemented in electronic hardware, or a combination of computer software and electronic hardware. Whether these functions are implemented in hardware or software depends on a specific application and design constraint of the technical solution. Those skilled in the art may use different methods to realize the described functions for each particular application, but such realization should not be considered to be beyond the scope of the present disclosure.

Those skilled in the art may clearly understand that for convenience and conciseness of description, the corresponding processes in the aforementioned method implementations may be referred to for the specific working processes of the system, apparatus and unit described above, and details are not described here again.

In the several implementations provided by the present disclosure, it should be understood that the disclosed systems, apparatuses and methods may be implemented in other ways. For example, the apparatus implementations described above are only illustrative, for example, the division of the units is only a logical function division, and there may be other division manners in actual realization. For example, multiple units or components may be combined or integrated into another system, or some features may be ignored or not executed. On the other hand, the mutual coupling or direct coupling or communication connection shown or discussed may be indirect coupling or communication connection between apparatuses or units through some interfaces, and may be in electrical, mechanical or other forms.

The units described as separated components may or may not be physically separated, and the component shown as a unit may or may not be a physical unit, i.e., it may be located in one place or may be allocated over multiple network units. Some or all of the units may be selected according to practical needs to achieve the purposes of the solutions of the implementations.

In addition, various functional units in various implementations of the present disclosure may be integrated in one processing unit, or various units may be physically present separately, or two or more units may be integrated in one unit.

The functions may be stored in a computer-readable storage medium if implemented in a form of a software functional unit and sold or used as a separate product. Based on this understanding, the technical solution of the present disclosure, in essence, or the part contributing to the existing art, or part of the technical solution, may be embodied in the form of a software product stored in a storage medium, including several instructions for causing a computer device (which may be a personal computer, a server, or a network device, etc.) to perform all or part of the acts of the methods in various implementations of the present disclosure. And the aforementioned storage medium includes: various media, such as a U disk, a mobile hard disk, a Read-Only Memory (ROM), a Random Access Memory (RAM), a magnetic disk, or an optical disk, etc., which may store program codes.

The foregoing are merely specific implementations of the present disclosure, but the protection scope of the present disclosure is not limited thereto. Any person skilled in the art may easily conceive of variations or substitutions within the technical scope disclosed by the present disclosure, which should be included within the protection scope of the present disclosure. Therefore, the protection scope of the present disclosure should be subject to the protection scope of the claims.

What we claim is:

1. A method for determining a Hybrid Automatic Repeat reQuest (HARQ) codebook, comprising:
   determining, by a terminal device, a target channel group, wherein grouping information of the target channel group is indicated by downlink control information (DCI), and the target channel group comprises at least one channel, and a first channel in the target channel group corresponds to a first HARQ codebook; and
   determining, by the terminal device, a target HARQ codebook to be transmitted on a first uplink resource, wherein the first uplink resource is an HARQ feedback resource corresponding to the target channel group, wherein
   when the first channel meets a first processing delay, the target HARQ codebook comprises the first HARQ codebook,
   when the first channel does not meet the first processing delay, the target HARQ codebook does not comprise a valid first HARQ codebook; wherein the first processing delay is determined according to processing capability of the terminal device.

2. The method of claim 1, wherein each channel in the target channel group is scheduled by the DCI.

3. The method of claim 1, wherein the first channel at least comprises a last channel in the target channel group.

4. The method of claim 1, wherein HARQ timing indicator information corresponding to the first channel indicates the first uplink resource.

5. An apparatus for determining a Hybrid Automatic Repeat reQuest (HARQ) codebook, comprising: a processor and a transceiver, wherein
   the processor is configured to determine a target channel group, wherein grouping information of the target channel group is indicated by downlink control information (DCI), and the target channel group comprises at least one channel, and a first channel in the target channel group corresponds to a first HARQ codebook; and determine a target HARQ codebook to be transmitted on a first uplink resource, wherein the first uplink resource is an HARQ feedback resource corresponding to the target channel group, wherein when the first channel meets a first processing delay, the target HARQ codebook comprises the first HARQ codebook, when the first channel does not meet the first processing delay, the target HARQ codebook does not comprise a valid first HARQ codebook; wherein the first processing delay is determined according to processing capability of the terminal device.

6. The apparatus of claim 5, wherein each channel in the target channel group is scheduled by the DCI.

7. The apparatus of claim 5, wherein the first channel at least comprises a last channel in the target channel group.

8. The apparatus of claim 5, wherein HARQ timing indicator information corresponding to the first channel indicates the first uplink resource.

9. An apparatus for determining a Hybrid Automatic Repeat reQuest (HARQ) codebook, comprising: a processor and a transceiver, wherein the processor is configured to determine a first uplink resource, wherein the first uplink resource is used for transmitting a target HARQ codebook corresponding to a target channel group, wherein grouping information of the target channel group is indicated by downlink control information (DCI), and the target channel group comprises at least one channel, and a first channel in the target channel group corresponds to a first HARQ codebook; and determine the target HARQ codebook, wherein when the first channel meets a first processing delay, the target HARQ codebook comprises the first HARQ codebook, when the first channel does not meet the first processing delay, the target HARQ codebook does not comprise a valid first HARQ codebook; wherein the first processing delay is determined according to processing capability of the terminal device.

10. The apparatus of claim 9, wherein each channel in the target channel group is scheduled by the DCI.

11. The apparatus of claim 9, wherein the first channel at least comprises a last channel in the target channel group.

12. The apparatus of claim 9, wherein HARQ timing indicator information corresponding to the first channel indicates the first uplink resource.

* * * * *